United States Patent [19]

Bonner

[11] 4,399,438

[45] Aug. 16, 1983

[54] CODED SIGNAL RADIO TRANSMITTER FOR REMOTE CONTROL MECHANISMS

[76] Inventor: Edgar L. Bonner, Rte. 4, Box 101-B, Taylorsville, N.C. 28681

[21] Appl. No.: 287,694

[22] Filed: Jul. 28, 1981

[51] Int. Cl.[3] .......................... H04B 7/00; H04Q 9/00

[52] U.S. Cl. .................................. 340/825.72; 331/47

[58] Field of Search .................. 455/42, 71, 108, 102, 455/103; 340/825.58, 825.71, 825.72, 825.73; 331/47; 332/30 V

[56] References Cited

U.S. PATENT DOCUMENTS

| | | | |
|---|---|---|---|
| 3,270,284 | 8/1966 | Schanbacher | 455/91 |
| 3,760,422 | 9/1973 | Zimmer et al. | 340/825.72 |
| 3,914,711 | 10/1975 | Carlson et al. | |
| 4,109,239 | 8/1978 | Davis | 340/825.58 |

*Primary Examiner*—Donald J. Yusko
*Attorney, Agent, or Firm*—Blair, Brown & Kreten

[57] ABSTRACT

A radio transmitter is operatively arranged to develop and broadcast a coded signal which may be used to effect remote control functions, for example, to control door opening mechanism. The transmitter includes a radio frequency oscillator having a coil which constitutes the radiating element. The radio frequency oscillator is modulated by a first low frequency oscillator, which is frequency modulated by output from a second low frequency oscillator, both low frequency oscillators being controlled by a timer which turns the low frequency oscillators ON for about one second and holds them OFF for about thirty seconds. The low frequency oscillators and the timer are realized by a commercially available, integrated CMOS circuit.

13 Claims, 8 Drawing Figures

LED
250 Hz
8 KHz
30 sec.
1 sec.

CODED SIGNAL RADIO TRANSMITTER FOR REMOTE CONTROL MECHANISMS

BACKGROUND OF THE INVENTION

This invention relates to a radio transmitter effective to produce a coded signal. More particularly, the invention relates to such a radio transmitter which is particularly suitable for utilization in remote control operations; for example, to effect the opening of a garage door mechanism. The coded signal can be used to identify individual transmitters and thus be useful in security applications.

In many remotely controlled actuator applications, such as automatic garage door openers and the like, it has long been desirable to produce a light-weight compacted radio frequency signal transmitter which may be carried in a motor vehicle and transmit a coded signal. Generally speaking, a tuned receiver associated with the actuator receives the coded signal and initates the operation of the actuator to either open or close a garage door or the like. It is desirable that such transmitters be able to transmit a coded signal so that a plurality of similar actuators can be utilized in a comparatively small geographic area, without the disadvantage of one coded radio transmitter undesirably effecting the operation of more than one actuator.

The transmitter, when used to control actuators, typically is required to transmit intermittenly a signal over comparatively short distances, for example 300 yards, thus it can be made relatively small.

In coding of the radiated signal, it has been known to provide that the frequency of the radiated radio frequency signal be made variable, within limits, such as between 250 and 300 megacycles which provides a first parameter for tuning the receiver which is to be associated with the actuator. As a second parameter, it has been proposed to amplitude modulate by an audio frequency signal, the radio frequency signal with a selected particular audio frequency, controllable and within the range of, for example, from about 12 to about 24 kilocycles. By selecting a particular radio frequency signal and a particular audio frequency signal, a comparatively significant number of such transmitters may be utilized in a comparatively small geographic area.

A radio frequency transmitting arrangement of the type mentioned above is disclosed in U.S. Pat. No. 3,270,284 granted on Aug. 30, 1956 to W. A. Schanbacher.

It has been recognized that the selection of a single modulating audio frequency and a particular radio frequency within a given band may not provide a sufficient number of possible permutations to allow a considerable number of transmitters in a limited geographic area. In order to provide for additional permutations, it has been proposed to utilize a dual modulation of a remote control transmitter. For example, it is known from the U.S. Pat. No. 3,316,488 granted on Apr. 25, 1967 to W. S. Reynolds to provide a remote control transmitter with a modulation arrangement which effects modulation of the radio frequency signal with two distinct, different audio frequency signals, one of the audio frequency signals being supplied for a given period to the exclusion of the other audio frequency signal while the other audio signal is supplied subsequently to the exclusion of the one audio signal. Thus, the transmitted coded signal has three distinct parameters which can be utilized to identify the particular transmitter involved.

It is known from the U.S. Pat. No. 3,914,711 granted Oct. 21, 1975 to C. R. Carlson et al. to construct a gated oscillator from a NAND circuit, which is associated with two inverters and other circuit elements.

SUMMARY OF THE INVENTION

It is a primary object of the present invention to provide a radio transmitter to effect the transmission of coded signals, which transmitter is modulated by a first low frequency or tone signal, which in turn has been frequency modulated by still lower frequency or lower tone signal.

It is another object of the present invention to provide a radio transmitter to effect the transmission of coded signals which has a limited and distinct ON time during periods when it is enabled.

It is a further object of the present invention to provide a radio transmitter to effect the broadcasting of coded signals which is under the control of a timer effecting its ON time during periods when it is enabled.

It is an additional object of the present invention to provide an oscillator arrangement in which one low frequency or tone oscillator is in effect frequency modulated by the output of another lower frequency or lower tone oscillator.

It is yet an additional object of the present invention to provide an oscillator arrangement which includes two low frequency or tone oscillators, the lower frequency from one being utilized to frequency modulate the other oscillator, both low frequency or tone oscillators being under the control of a timer effecting the ON times of the two oscillators.

The foregoing objects, as well as others, are achieved by the present invention, in its transmitter aspect, by providing a signal to effect remote control, to identify the individual transmitter or the like. The transmitter includes a timer for supplying a timing signal. A first low frequency oscillator and second low frequency oscillator are coupled to the timer and respond to its output, generating respectively a first low frequency signal and a second low frequency signal. The second low frequency signal is of a lower frequency than the first low frequency signal. A modulator frequency modulates the first low frequency oscillator with the second low frequency signal. A radio frequency stage is coupled to the first low frequency oscillator and responds to its frequency modulated output signal to produce an intermittant radio frequency output modulated by the frequency modulated signal from the first low frequency oscillator.

The first and the second low frequency oscillators may include respective first and second NAND circuits, each having a respective first input terminal coupled to the timer and responsive to its output so as to be intermittently enabled thereby. A first RC circuit is provided for establishing the frequency at which the first low frequency oscillator is to operate in the absence of modulation being supplied thereto. The first RC circuit is in circuit between a second input terminal and an output terminal of the first NAND circuit. A second RC circuit is provided for establishing a second frequency at which the second low frequency oscillator is to operate, the second RC circuit being in circuit between a second input terminal and an output of the second NAND circuit. The modulator includes a diode connected in series with a capacitor between a point of reference potential and the second input terminal of the first NAND circuit. A switch which may be a transistor switch, is connected in series between the diode and a source of potential.

The radio frequency stage may advantageously be a radio frequency oscillator.

The radio frequency oscillator preferably has a tank coil operatively arranged to constitite the radiating element of the transmitter.

The timer can be operatively arranged to effect an ON time of substantially one second and an OFF time of substantially thirty seconds for the oscillators and the radio frequency stage.

The NAND circuits are advantageously respective Schmitt trigger circuits.

The timer may include a first resistor, a capacitor and a second resistor connected in series across terminals of a potential source. A NAND circuit has a first input terminal connected to a junction of the capacitor with the second resistor. A resistive circuit is connected between the first terminal of the potential source and a second input terminal of the NAND circuit. An inverter is coupled to the NAND circuit and responds to its output. A switch is connected between a junction of the capacitor with the first resistor and an output terminal of the inverter.

The invention, in a subcombination aspect, is constituted by an oscillator arrangement which includes a timer, a first and a second low frequency oscillator, each oscillator including respective first and second NAND circuits, and having a respective first input terminal coupled to the timer and responsive to its output so as to be intermittently enabled thereby. A first RC circuit establishes a frequency at which the first oscillator is to operate in the absence of modulation being supplied thereto, this first RC circuit being in circuit between a second input terminal and an output terminal of the first NAND circuit. A second RC circuit establishes a second frequency at which the second oscillator is to operate, this second RC circuit being in circuit between a second input terminal and an output terminal of the second NAND circuit. A modulating circuit includes a diode connected in series with a capacitor between a point of reference potential and the second input terminal of the first NAND circuit. A switch, which may be a transistor switch, is connected in series between the diode and a source of potential.

DETAILED DESCRIPTION OF THE DRAWINGS

Figures 1, 2A, 2B, 2C, 2D, 2E, 2F, 2G:
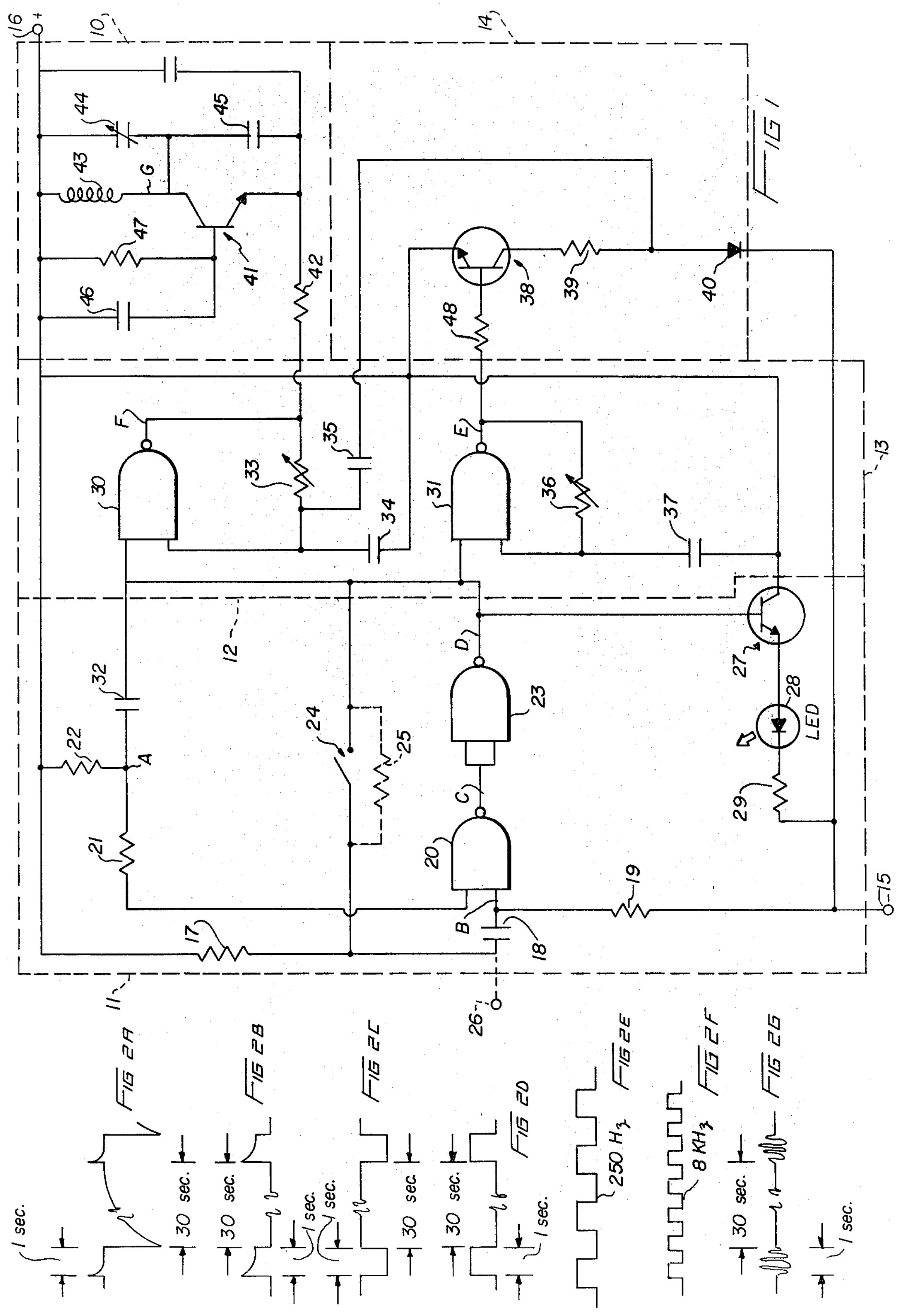
FIG. 1 is a schematic drawing of an illustrative radio transmitter for effecting the production of coded signals in accordance with an illustrative embodiment of the present invention in its transmitter aspect.
FIGS. 2A–2G are respective wave forms which appear respectively at points A–G in FIG. 1 when the transmitter is enabled to aid one in understanding the operation of the present invention.

As shown in FIG. 1, an illustrative embodiment of a transmitter to effect the broadcasting of coded signals includes broadly a radio frequency oscillator 10, an electronic timer 11, a first tone or low frequency oscillator 12, a second lower frequency or tone oscillator 13 and a modulator 14.

As illustrated the transmitter is powered by a suitable D.C. voltage source connected between terminals 15 and 16, the positive pole of the source being connected to the terminal 16.

The timer 11 includes a resistor 17, a capaciator 18, and a resistor 19 connected between the supply terminals 15, 16. The junction between the capacitor 18 and the resistor 19 is connected to a first input of a NAND circuit 20. A second input of the NAND circuit 20 is connected to the positve supply terminal 16 via resistors 21, 22 connected in series. The output of the NAND circuit 20 is connected to the input of an inverter 23 which has its output connected to a junction between the resistor 17 and the capacitor 18 via a normally closed switch 24. In a variant of the circuit, the switch 24 may be replaced by a resistor, illustrated in dotted lines as resistor 25. In this variant, a terminal 26 would be connected to the junction between the resistor 17 and the capacitor 18 for receiving a positive going pulse for the purpose of starting the timer 11. In the illustrated embodiment with the switch 24, the timer 11 is started by opening the switch 24.

The output of the inverter 23 is connected to the base of a transistor 27 which has its emitter connected via a light emitting diode (LED) 28 and a resistor 29 to the negative terminal 15 of the voltage supply source. The collector or the transistor 27 is connected to the positive terminal of the supply source.

The output of the inverter 23 is also connected to respective first input terminals of NAND gates 30 and 31, these NAND gates forming respectively the active elements of the respective low frequency or tone oscillators 12 and 13. The first input to the NAND gate 30 is also connected to the junction between the resistors 21 and 22, via a capacitor 32. The output of the NAND gate 30 is connected to a second input of the NAND gate 30 via a resistor 33, illustrated as a variable resistor whose value can be selected during assembly and which, with capacitors 34 and 35, determine the time constant of the circuit and thus the frequency at which the first low frequency or tone oscillator 12 will oscillate. The second low frequency or tone oscillator 13 includes a resistor 36, illustrated as a variable resistor, connected between the output of the NAND circuit 31 and its second input terminal. The second input terminal of the NAND circuit 31 is also connected to the collector of the transistor 27, via a capacitor 37.

The output of the NAND circuit 31 is also connected, via a resistor 48, to the base of a transistor 38 which has its collector connected to the negative terminal 15 of the voltage source via series connected resistor 39 and diode 40. The junction between the resistor 39 and the diode 40, illustrated as the anode of the diode 40, is connected to that plate of the capacitor 35 which is not connected to the second input terminal of the NAND circuit 30. The emitter of the transistor 38 is also connected to the second input terminal of the NAND gate 30, via the capacitor 34.

The radio frequency oscillator 10, as illustrated, is shown as a conventional Colpritts oscillator. The circuit includes a transistor 41 having its emitter connected, via a resistor 42, to the output of the NAND circuit 30. The collector of the transistor 41 is connected, by a parallel tuned tank circuit constituted by a coil 43 and a varible capacitor 44, to the positive input terminal 16 of the voltage source. The collector of the transistor 41 is also connected to the junction between the emitter thereof and the resistor 42 via a fixed capacitor 45. A parallel connected capacitor 46 and a resistor 47 are connected between the positive terminal 16 of the voltage source and the base of the transistor 41.

The switch 24 is normally closed. In this condition, the total circuit if OFF. There is no current flow in the circuit except for device leakage current. When the switch 24 is opened, the capacitor 18 charges via the resistor 17 to cause a positive pulse to be coupled to a first input of the NAND circuit 20. This causes the output of the NAND circuit 20 to go negative and the output of the inverter 23 goes positive, which activates the low frequency or tone oscillators 12 and 13, and turns on the light emitting diode 28. This also couples a positive pulse through the capacitor 32 and the positive terminal of the capacitor 32 is quickly discharged to the positive terminal 16 of the voltage source, via the resistor 21 and a protective diode (not shown) in the first input of the NAND circuit 20. (The integrated circuit, which forms the circuit members 20, 23, 30 and 31, has protective diodes to + and − on all inputs.) The net charge on the capacitor 32 at this point is zero because both terminals are positive. The capacitor 18 and the second input terminal of the NAND circuit 20 begin to charge negative. When the lower Schmitt trigger threshold is reached, the output of the NAND circuit 20 goes positive and output from the inverter 23 goes negative. The two low frequency oscillators 12, 13 and the transmitter are now OFF. The time ON is set by the charge time of the resistor 19 and the capacitor 18 at, for example, one second.

Since when the transmitter first cuts off, the capacitor 32 has zero charge when the output of the inverter goes negative, a negative pulse or charge is coupled via the capacitor 32 to the first input of the NAND circuit 20. The transmitter can not be re-activated until the first input of the NAND circuit 20 is positive again. This occurs when the capacitor 32 charges positive via the resistor 22. Consequently, the minimum OFF time is set by the charge time of the resistor 22 and the capacitor 32 at, for example, thirty seconds.

In case the switch 24 is replaced by the resistor 25, the transmitter would be triggered simply by application of a positive pulse to the terminal 26.

In operation, the output of the low frequency oscillator 12 turns ON and OFF the transistor 38 at the low frequency rate. When the transistor 38 is ON, current flows through the diode 40 and the capacitor 35 sees a low impedance at the anode of the diode 40. During this period, the frequency of the low frequency oscillator 12 is lowered because current flowing in the feedback resistor 33 must charge and discharge the capacitor 35 in addition to the capacitor 34. When the transistor 38 is OFF no current flows through the diode 40. During this second period, the capacitor 35 is effectively out of the circuit and the higher frequency, low frequency oscillator 12 operates at a frequency determined substantially solely by the resistor 33 and the capacitor 34. In this manner the lower frequency, low frequency oscillator 13 frequency modulates the higher frequency, low frequency oscillator 12, via the modulator 14.

It is to be understood that the foregoing text and accompanying drawing figures relate to an illustrated embodiment and one variant set out by way of example and not by way of limitations. Numerous other embodiments and variants are possible within the spirit and scope of the invention, its scope being defined by the appended claims.

What is claimed is:

1. A radio transmitter for transmitting a coded signal, the transmitter comprising timer means for supplying a timing signal; first low frequency oscillator means and second low frequency oscillator means coupled to said timer means and responsive to its output for generating respectively a first low frequency signal and a second low frequency signal, the second low frequency signal being of a lower frequency than the first low frequency signal; means for frequency modulating said first low frequency oscillator means with the second low frequency signal; and radio frequency signal means coupled to said first low frequency oscillator means and responsive to its frequency modulated output signal for producing an intermittant radio frequency output modulated by the frequency modulated output signal wherein said first and second low frequency oscillator means comprise respective first and second NAND circuits, each having a respective first input terminal coupled to said timer means and responsive to its output so as to be intermittently enabled thereby; a first RC circuit means for establishing frequency at which said first low frequency oscillator means is to operate in the absence of modulation being supplied thereto, said first RC circuit means being in circuit between a second input terminal and an output terminal of said first NAND circuit; a second RC circuit means for establishing a second frequency at which said second low frequency oscillator is to operate, said second RC circuit means being in circuit between a second input terminal and an output of said second NAND circuit; and wherein said modulating means includes a diode connected in series with a capacitor between a point of reference potential and said second input terminal of said first NAND circuit and a switching means connected in series between said diode and a source of potential.

2. A radio transmitter according to claim 1 wherein said radio frequency signal means is a radio frequency oscillator.

3. A radio transmitter according to claim 1, wherein said radio frequency signal means includes a tank coil operatively arranged to constitute the radiating element of the transmitter.

4. A radio transmitter according to claim 1 wherein said timer means is operatively arranged to effect an ON time of substantially one second and an OFF time of substantially thirty seconds for said first low frequency oscillator means, said second low frequency oscillator means and said radio frequency signal means.

5. A radio transmitter according to claim 1, wherein said first NAND circuit and said second NAND circuit are respective Schmitt trigger circuits.

6. A radio transmitter according to claim 1, wherein said timer means comprises a first resistor; a capacitor and a second resistor connected in series across first and second terminals of a potential source; NAND circuit means having a first input terminal connected to a junction of said capacitor with said second resistor; resistive circuit means connected between said first terminal of said potential source and a second input terminal of said NAND circuit means; an inverter coupled to said NAND circuit means and responsive to its output; and a switch connected between a junction of said capacitor with said first resistor and an output terminal of said inverter.

7. A radio transmitter according to claim 1, wherein said timer means comprises a first resistor; a capacitor and a second resistor connected in series across first and second terminals of a potential source; NAND circuit means having a first input terminal connected to a junction of said capacitor with said second resistor; resistive circuit means connected between said first terminal of said pootential source and a second input terminal of said NAND circuit means; and inverter coupled to said NAND circuit means and responsive to its output; a further resistor connected between a junction of said capacitor with said first resistor and an output terminal of said inverter; and means for receiving a pulse signal connected to said junction between said capacitor and said first resistor.

8. A radio transmitter for transmitting a coded signal, the transmitter comprising timer means for supplying a timing signal; first low frequency oscillator means and second low frequency oscillator means coupled to said timer means and responsive to its output for generating respectively a first low frequency signal and a second low frequency signal, the second low frequency sisgnal being of a lower frequency than the first low frequency signal; means for frequency modulating said first low frequency oscillator means with the second low frequency signal; and radio frequency signal means coupled to said first low frequency oscillator means and responsive to its frequency modulated output signal for producing an intermittant radio frequency output modulated by the frequency modulated output signal wherein said radio frequency signal means is a radio frequency oscillator.

9. A radio transmitter according to claims 2 or 8, wherein said radio frequency oscillator includes a tank coil operatively arranged to constitute the radiating element of the transmitter.

10. A radio transmitter according to claim 2 or 8, wherein said timer means is operatively arranged to effect an ON time of substantially one second and an OFF time of substantially thirty seconds for said first low frequency oscillator means, said second low frequency oscillator means and said radio frequency signal means.

11. An oscillator arrangement comprising timer means; first and second low frequency oscillator means including respective first and second NAND circuits, each having a respective first input terminal coupled to said timer means and responsive to its output so as to be intermittently enabled thereby; a first RC circuit means for establishing a frequency at wich said first oscillator means is to operate in the absence of modulation being supplied thereto, said first RC circuit means being in circuit between a second input terminal and an output terminal of said first NAND circuit; a second RC circuit means for establishing a second frequency at which said second oscillator is to operate, said second RC circuit means being in circuit between a second input terminal and an output of said terminal second NAND circuit; and modulating means including a diode connected in series with a capacitor between a point of reference potential and said second input terminal of said first NAND circuit and a switching means connected in series between said diode and a source of potential.

12. An oscillator arrangement according to claim 11, wherein said timer means comprises a first resistor, a capacitor and a second resistor connected in series across first and second terminals of a potential source; a third NAND circuit having a first input terminal connected to a junction of said capacitor with said second resistor; resistive circuit means connected between said first terminal of said potential source and a second input terminal of said third NAND circuit; an inverter coupled to said third NAND circuit and responsive to its output; and a switch connected between a junction of said capacitor with said first resistor and an output terminal of said inverter.

13. An oscillator arrangement according to claim 11, wherein said timer means comprises a first resistor, a capacitor and a second resistor connected in series across first and second terminals of a potential source; a third NAND circuit having a first input terminal connected to a junction of said capacitor with said second resistor; resistive circuit means connected between said first terminal of said potential source and a second input terminal of said third NAND circuit; an inverter coupled to said third NAND circuit and responsive to its output; a further resistor connected between a junction of said capacitor with said first resistor and an output terminal of said inverter; and means for receiving a pulse signal connected to said junction between said capacitor and said first resistor.

* * * * *